United States Patent [19]

Viola et al.

[11] Patent Number: 5,073,982
[45] Date of Patent: Dec. 17, 1991

[54] APPARATUS FOR CONNECTING MULTIPLE PASSIVE STARS IN A FIBER OPTIC NETWORK

[75] Inventors: Jeffrey P. Viola, Brookhaven, Pa.; Joseph B. Sergi, Medford, N.J.

[73] Assignee: General Electric Company, Camden, N.J.

[21] Appl. No.: 402,195

[22] Filed: Sep. 1, 1989

[51] Int. Cl.$^5$ ............................................. H04B 10/12
[52] U.S. Cl. .................... 359/120; 370/94.3; 370/108; 359/121; 359/140
[58] Field of Search ............. 455/600, 606, 607, 617, 455/612; 370/17, 80, 94.3, 108, 101, 1, 4; 340/825.02, 825.61

[56] References Cited

U.S. PATENT DOCUMENTS

| 4,227,260 | 10/1980 | Vojvodich et al. | 455/601 |
|---|---|---|---|
| 4,270,029 | 5/1981 | Sato et al. | 179/175.31 |
| 4,494,185 | 1/1985 | Gunderson et al. | 364/200 |
| 4,516,272 | 5/1985 | Yano | 455/607 |
| 4,543,666 | 9/1985 | Witte et al. | 455/612 |
| 4,630,254 | 12/1986 | Tseng | 370/1 |
| 4,641,371 | 2/1987 | Shutterly | 455/601 |
| 4,644,587 | 2/1987 | Takahashi et al. | 455/601 |
| 4,646,361 | 2/1987 | Usui | 455/601 |
| 4,654,889 | 3/1987 | Shutterly | 455/601 |
| 4,688,260 | 8/1987 | Shutterly et al. | 455/601 |
| 4,701,756 | 10/1987 | Burr | 370/60 |
| 4,701,909 | 10/1987 | Kavehrad | 370/4 |
| 4,712,859 | 12/1987 | Albanese et al. | 360/96.16 |
| 4,747,094 | 5/1988 | Sakaguchi et al. | 370/4 |
| 4,781,427 | 11/1988 | Husbands et al. | 360/96.16 |
| 4,797,951 | 1/1989 | Duxbury et al. | 455/608 |
| 4,805,196 | 2/1989 | Cooperman | 370/107 |
| 4,977,593 | 12/1990 | Ballance | 455/612 |

Primary Examiner—Curtis Kuntz
Assistant Examiner—L. Pascal
Attorney, Agent, or Firm—Raymond E. Smiley

[57] ABSTRACT

A fiber optic local area network including a plurality of passive star couplers each capable of connecting to a plurality of users. One connection input to and output from each passive star coupler is connected to a respective output and input of an active star coupler. The active star coupler stores the round-trip transmission times to each passive star coupler and upon receipt of a signal from a passive star coupler inhibits output to that passive star coupler for the signal duration and inhibits input from all other passive star couplers for the signal duration plus the round-trip transmission delay.

14 Claims, 7 Drawing Sheets

ACTIVE STAR 30

FIG. 3A
ACTIVE STAR 30

FIG. 3B
ACTIVE STAR 30

FIG. 4   ROUND TRIP DELAY MODULE X (X = 1 TO N)

5,073,982

APPARATUS FOR CONNECTING MULTIPLE PASSIVE STARS IN A FIBER OPTIC NETWORK

BACKGROUND OF INVENTION

1. Field of Invention

The present invention is concerned with local area networks, and more particularly, with fiber optic token bus networks utilizing active and passive star couplers.

2. Description of the Prior Art

Fiber optic networks utilize various architectures or interconnect techniques for providing communication access between all nodes or users on the network. Configurations such as rings, tapped linear buses and star coupled buses are common examples of such architectures. Star coupled networks have several known advantages over other types of networks. An optical star coupler is a passive, optical mixing element of either a transmissive or reflective variety. The transmissive star coupler (which uses a fusion region for the signal mixing) is the more common of the two. Any signal entering an input port of a passive star is divided and sent to all output ports, creating an effective bus interconnection. There is, however, a practical limit to the size (i.e., number of ports) that can be constructed, an exemplary number being 64.

In order to extend the number of users that may access the network, it is possible to interconnect several passive star sub-networks with an active star (one using active, as opposed to entirely passive, components). An active star is typically used because a passive "hub" would result in multiple signal reflections of messages or signals that originate anywhere on the composite network. Thus, some "intelligence" must be provided in the central sub-network combiner (active star) to provide proper signal routing, while preventing unwanted reflections.

SUMMARY OF THE INVENTION

In accordance with a preferred embodiment of the present invention, apparatus for use in a fiber optic network which includes first an second passive stars and means providing a bidirectional signal transmission path between each of the passive stars and the apparatus is disclosed. The apparatus comprises in combination first means adapted for storing a value representing the round trip signal delay time between the apparatus and each of the passive stars, second means adapted to receive a signal from each of the passive stars, third means adapted to transmit the signal to each of the passive stars, fourth means coupled to the second and third means and adapted to respond to a signal received from one of the passive stars for blocking transmission of a signal back to that passive star during the time duration that the signal is being received from the one passive star, and fifth means coupled to the first means and the second means and adapted to block receipt of a signal from the other of the passive stars for a time which is a function of the duration of the received signal plus the time of the round trip signal delay stored in the first means.

BRIEF DESCRIPTION OF THE DRAWINGS

FIGS. 3A and 3B, hereinafter collectively, FIG. 3, illustrate selected portions of an active star structure of the type utilized in FIG. 2;

DETAILED DESCRIPTION

Figure 1:
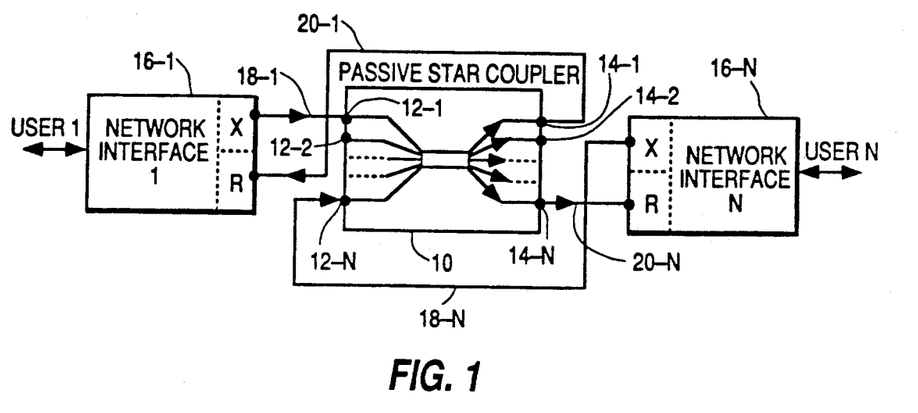
FIG. 1 is a typical passive star coupler connected to multiple users or more particularly the network interface portions thereof in accordance with the prior art and which is used in conjunction with the present invention.

Referring now to FIG. 1, a typical fiber optic passive star coupler 10 is illustrated. Passive star coupler 10 or passive star 10 is available from a number of manufacturers, such as Model No. TCS64X64, manufactured by Canstar, 3900 Victoria Park Avenue, North York, Ontario, Canada.

Passive star 10 has N signal input terminals 12-1, 12-2 ... 12-N and N signal output terminals 14-1, 14-2 ... 14-N, each coupled to an associated network interface unit. Two exemplary network interface units 16-1 and 16-N are illustrated. Connection between the passive star 10 and network interface unit 16 is by means of fiber optic transmission lines such as 18-1, 18-N, 20-1 and 20-N. The purpose of the network interface unit is to convert between electrical signals utilized by users such as user 1 connected to network interface unit 16-1, and corresponding optical signals utilized by optical transmission line 18 and passive star 10. The network's interface units are standard devices available from a number of manufacturers such as Model MFV-21, available from Computrol, 15 Ethan Allen Highway, Ridgefield, Conn. Thus, for example, fiber optic transmission line 18-1 connects between the transmitter (X) output of network interface unit 16-1 and input 12-1 of passive star 10 allowing electrical signals generated by user 1 to be transmitted as optical signals over transmission line 18-1. Similarly, a typical output of passive star 10 such as 14-1 is connected via optical transmission line 20-1 to the receiving (R) input of network interface 16-1 where the optical signal passing through transmission line 20-1 is connected to an electrical signal and passed to user 1.

The network of FIG. 1 commonly operates in what is known as a token bus configuration. That is, only one user, and therefore one network interface unit at a time, transmits a desired signal beginning with the address of the desired user. Assuming, for example, that user 1 wishes to transmit a signal via network interface 1 to a selected one of the plurality of network interface units 16 and users, the signal produced by user 1 is converted to an optical signal and passed via transmission line 18-1 to passive star coupler 10. A signal input at any of the input terminals 12-1 ... 12-N of passive star coupler 10 are transmitted to all output terminals 14-1 ... 14-N and to all of the respective network interface units including, in this instance, network interface 16-1. User 1 has circuitry (not illustrated) which identifies the received signal over transmission line 20-1 as being not its destination and does not utilize the signal. However, the signal is transmitted, as indicated above, to all other network interface units and therefore to all other users to be used by the selected one of them.

As indicated above, a limited number of users can be connected to any one of passive star couplers 10, an exemplary number being 64. It is not possible to add more users by simply connecting one set of output and input terminals of one passive star respectively, to one set of input and output terminals of an additional passive star since the signal sent to this additional star from any originating passive star will be reflected back from all receiving stars causing multiple reflections on the overall star network. In addition, the insertion loss of the additional passive star may cause excessive signal attenuation, rendering the signal non-recoverable at the network interface unit receivers.

Figure 2:
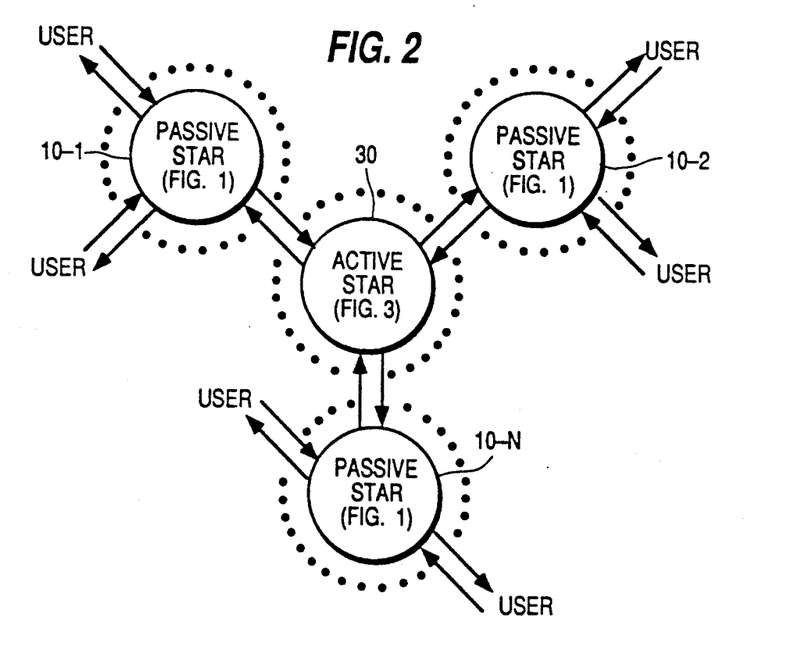
FIG. 2 is a local area network system including a plurality of the passive star couplers of FIG. 1 interconnected with an active component star.

To overcome the above-mentioned problem, and with reference to FIG. 2, an active star arrangement is illustrated in which a plurality of passive stars 10, for example 10-1, 10-2 . . . 10-N, are coupled to active star 30. It will be understood that the number of users N connected to a passive star is not necessarily the same as the number of passive stars N that can be connected to an active star. Each passive star 10 is of the type illustrated in FIG. 1 and may be coupled to multiple users as illustrated in FIGS. 1 and 2. Each passive star and its users is termed a sub-network. The problem in general with such an arrangement as illustrated in FIG. 2 is that, when a signal is transmitted to active star 30, it behaves similarly to a typical passive star in that it transmits signals received at any input terminal back to all passive stars including the one that transmitted to it in the first place, causing undesired signal reflections.

One possible solution in connection with FIG. 2 is the use of multiple optical frequencies (Wavelength Division Multiplexing, WDM) such that when a signal is transmitted to active star 30, the output is on a different frequency such as disclosed in U.S. Pat. Nos. 4,641,371 and 4,654,8B9, issued Feb. 3, 1987 and Mar. 31, 1987, respectively, to Shutterly. However, this solution has its own set of problems in that WDM optical combiners and filters with their attendant cost, insertion loss and stability problems, combined with the cost and limitations of optoelectronic devices with different wavelength sensitivity are required. Also, as disclosed in the aforementioned patents to Shutterly, multiple star connections require the signal to transverse a plurality of WDM repeaters which can degrade the signal fidelity, etc.

Figure 3A:
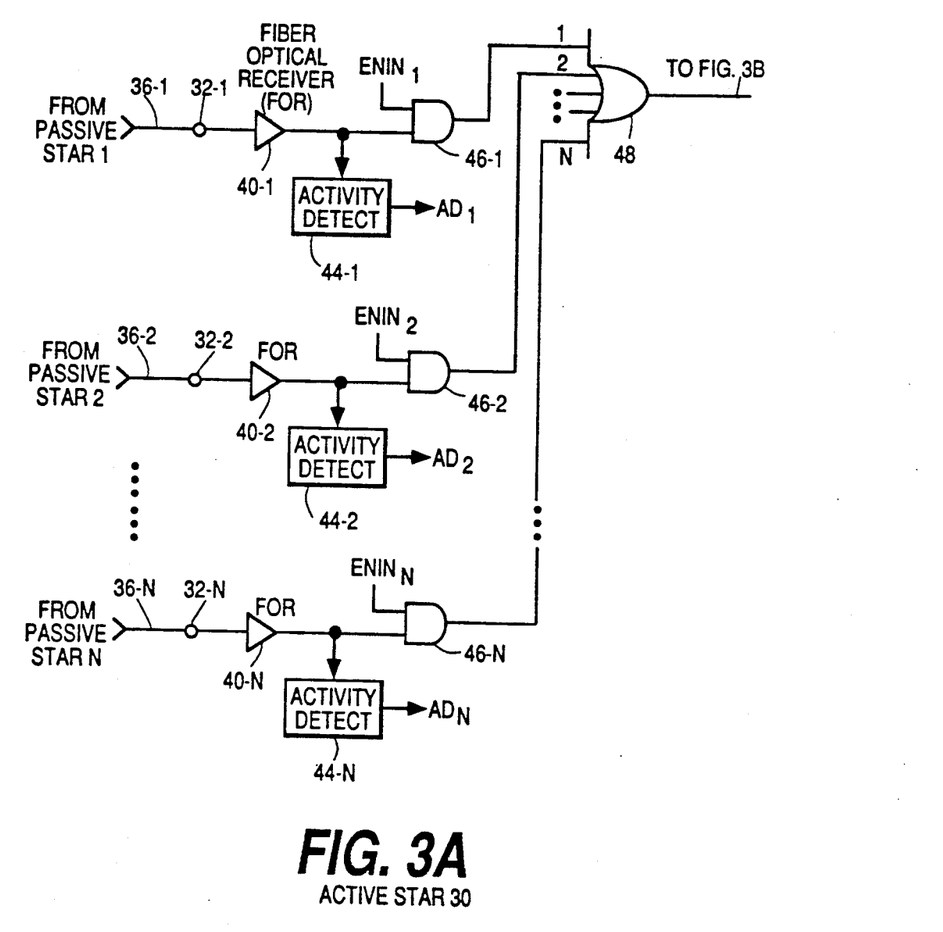
Figure 3B:
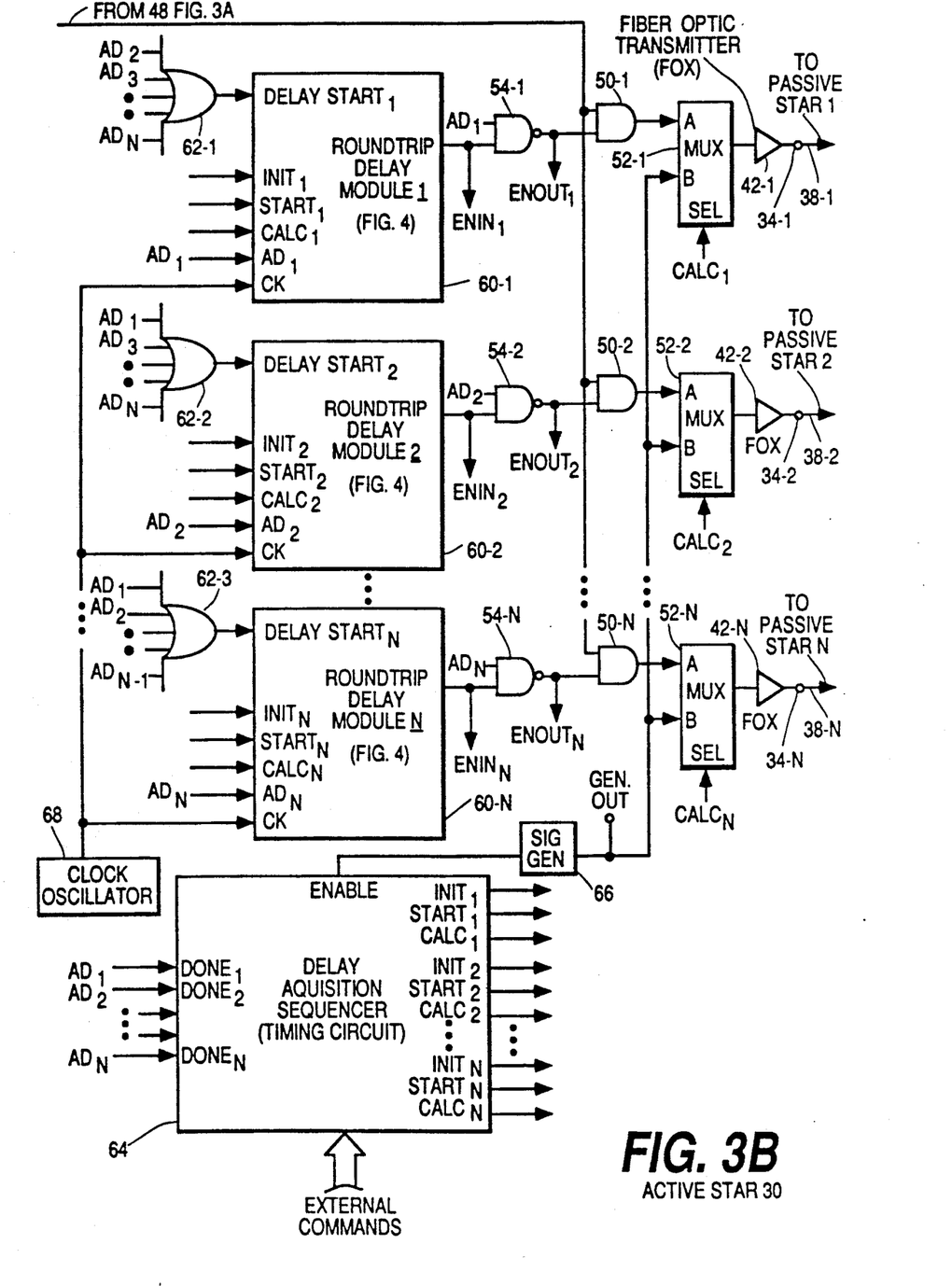

Referring now to FIG. 3, an active star 30 is illustrated in accordance with the teachings of the present invention. Active star 30 includes a plurality of input terminals 32-1 . . . 32-N and a like plurality of output terminals 34-1 . . . 34-N. Input terminal 32-1 is connected via a fiber optic transmission line 36-1 to passive star 10-1 (FIG. 2) while output terminal 34-1 is connected via fiber optic cable 38-1 to an input of passive star 10-1 (FIG. 2). Other passive stars are connected in a similar manner to various ones of the input terminals 32 and output terminals 34 of active star 30. Each input terminal such as 32-1 within active star 30 is connected to a fiber optic receiver (FOR) such as 40-1 which converts optical signals received thereat into electrical signals. Similarly, each output terminal such as 34-1 is coupled to receive an optical signal from a fiber optic transmitter (FOX) such as 42-1 which acts to convert electrical signals received at its input terminal 44 into optical signals for transmission over transmission line 38-1. Transmitters 42-2, 42-N and other transmitters (not shown) are of a similar type as transmitter 42-1 and perform in a similar manner. Fiber optic receivers 40-2, 40-N, and other fiber optic receivers (not shown) are similar in construction and operation to fiber optic receiver 40-1.

The output of fiber optic receiver 40-1 is connected to an activity detector circuit 44-1 and as one input to an AND gate 46-1. Activity detector 44-1 is responsive to the presence of an input signal at fiber optic receiver 40-1 to produce a pulse corresponding in time and time duration to that of the input signal at output $AD_1$. The pulse itself will be appropriately referred to as $AD_1$. Activity detectors 44-2, 44-N and other activity detectors 44-X (not shown) operate in a similar manner to that described for activity detector 44-1. The outputs of AND gates 46-1, 46-2, 46-N and of other AND gates 46-X (not illustrated) are coupled to respective inputs of an OR gate 48. The output of OR gate 48 is optionally coupled to data recovery (restrobe) and reclocking circuitry (not shown and not relevant to the purposes of the present invention).

The output of AND gate 50-1 is coupled to one input (A) of a multiplexer 52-1. The output of multiplexer 50-1 is coupled to the input of FOX 42-1. FOX 42, as mentioned previously, converts electrical signals received thereat into optical signals for transmission to terminal 34-1 and thence to the input of the passive star 10-1 to which fiber optic transmitter 42-1 is coupled. Similar remarks apply to the interconnection of other AND gates 50-X, multiplexers 52-X and associated fiber optic transmitters 42-X where X is 2 through N.

Returning to activity detectors 44-X, the $AD_x$ outputs thereof are coupled to respective inputs of NAND gates 54-X (54-1, 54-2 and 54-N being illustrated) and to respective $AD_x$ inputs of round trip delay module circuits 60-X (e.g. $AD_1$ output of activity detector 44-1 to $AD_1$ input of round trip delay module 60-1, etc.) which will be described in more detail hereinafter in connection with a discussion of FIG. 4. Briefly, however, each circuit 60-X provides a means to determine and store the round trip signal delay to its respective star 10-X and to inhibit transmission and receipt of messages to and from the various passive stars.

The $AD_x$ outputs of each activity detector 44-X, except for one, are coupled to respective inputs of OR gates 62-X, the outputs of which are coupled to the DELAY START$_x$ input of respective modules 60-X. The one exception in each case is the particular $AD_x$ signal associated with that module. Thus, for module 60-2 signal $AD_2$ is not applied to OR gate 62-2.

Figure 5:
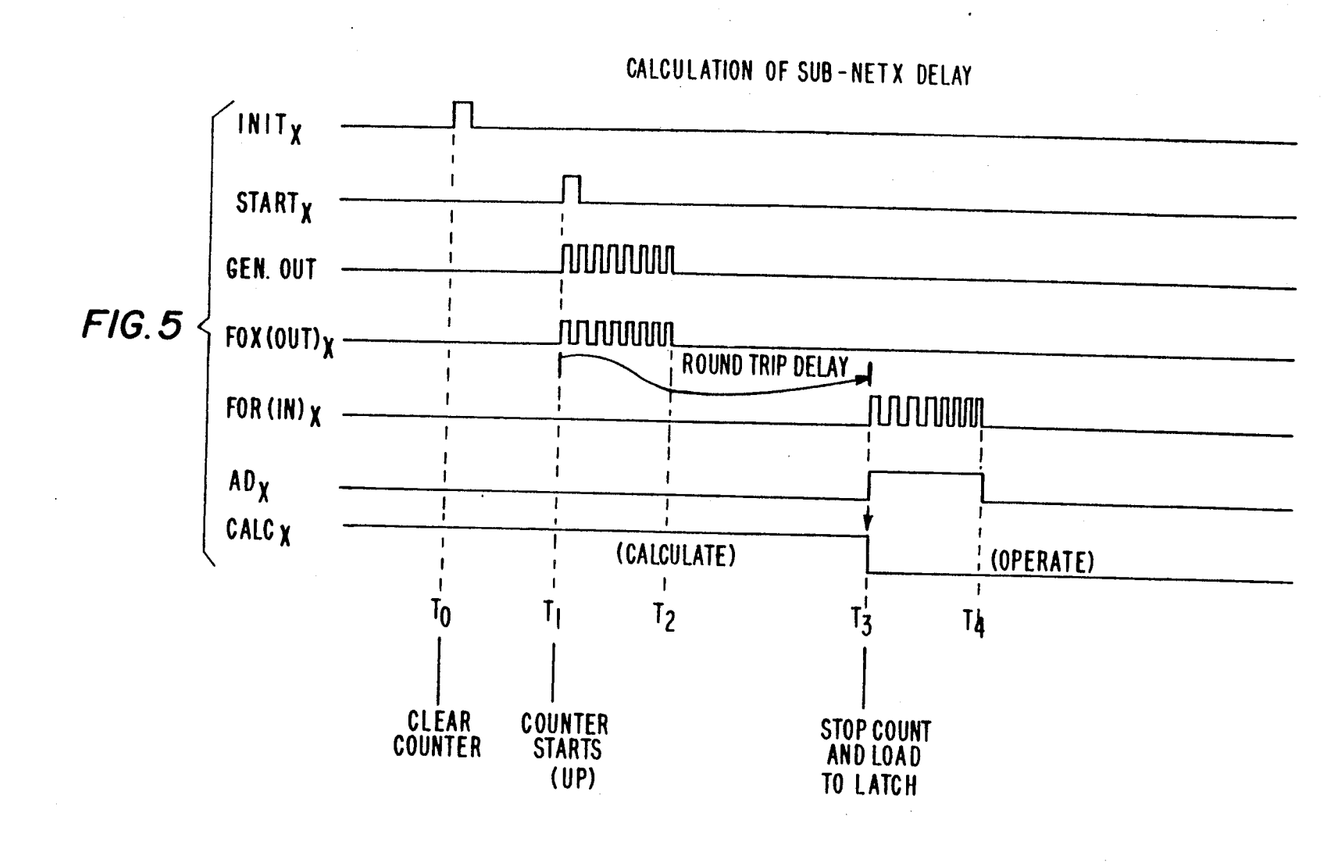
FIGS. 5, 6 and 7 are timing diagrams useful in understanding the operation of FIGS. 3 and 4.
Figure 6:
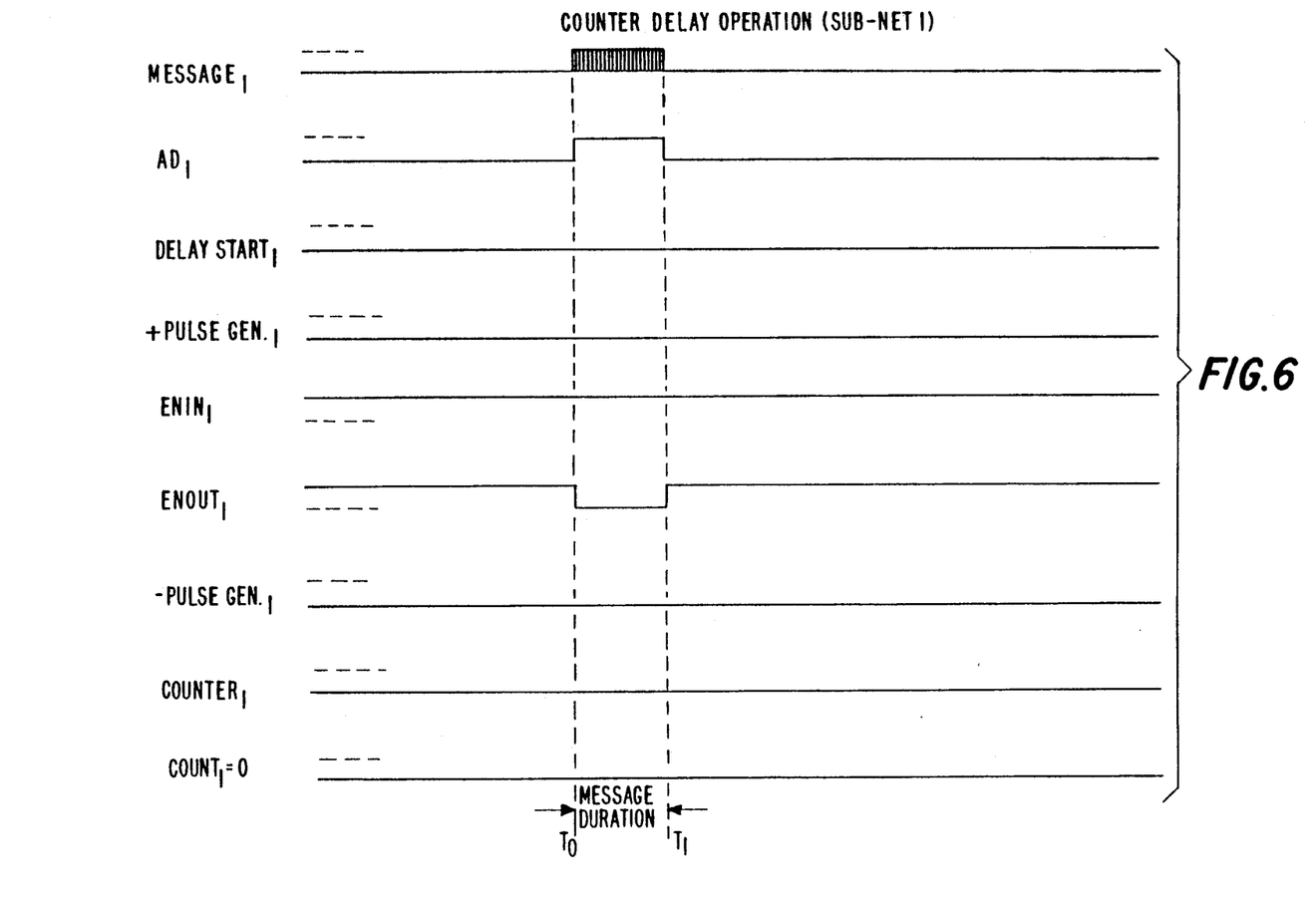
Figure 7:
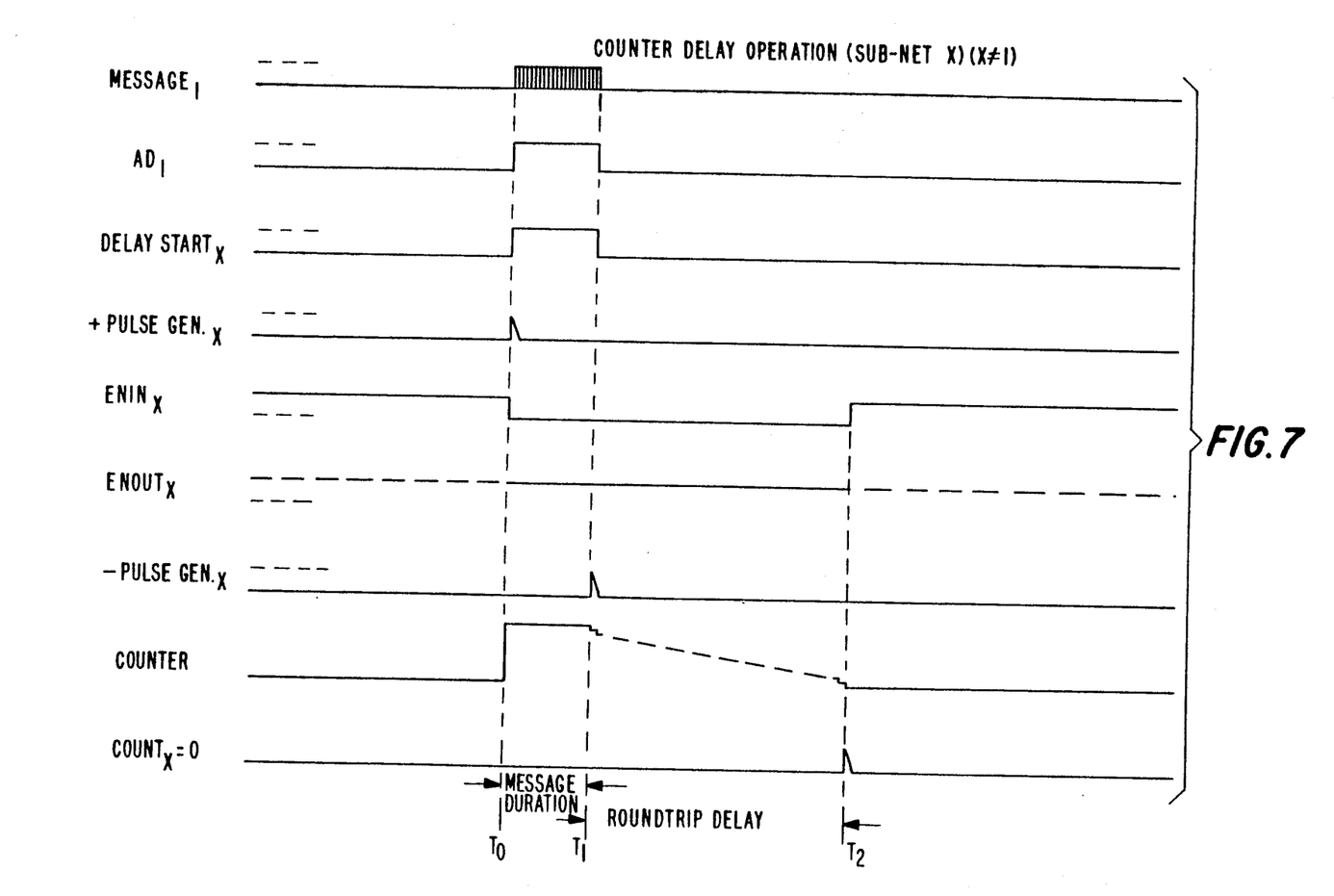

All the $AD_x$ signals are also applied to a delay acquisition sequencer 64 and particularly to inputs labelled DONE$_1$, DONE$_2$ . . . DONE$_N$ thereof. Sequencer 64 is essentially a timing circuit responsive to the various $AD_x$ signals and other external signals applied thereto for providing various output timed pulses as indicated in FIGS. 5, 6 and 7. From a review of FIGS. 5, 6 and 7 a person of ordinary skill in the art could easily construct sequencer 64 so no further details thereof will be given.

A set of three timing outputs, INIT$_x$, START$_x$ and CALC$_x$ from sequencer 60 is coupled to similarly legended inputs of a respective module 60-X. An ENABLE output from sequencer 64 is coupled to and enables a signal generator 66 to produce a signal burst output of predetermined value at GEN OUT. GEN OUT is coupled as a second (B) input to each of multiplexers 52-X.

The various CALC$_x$ outputs from sequencer 64 are coupled to select (SEL) inputs of respective multiplexers 52-X to determine which signal input, that at A or B, is output to FOX 42-X.

The output $ENIN_x$ of each module 60-X is coupled to a second input of NAND gate 54-X and to a second input of AND gate 46-X. The output of NAND gate 54-X is a signal $ENOUT_x$ (enable output X) and is coupled to an AND gate 50-X. A clock oscillator 68 produces periodic pulses of frequency f which are coupled to the CK inputs of each of modules 60-X. An exemplary frequency is 100 MHz.

Figure 4:
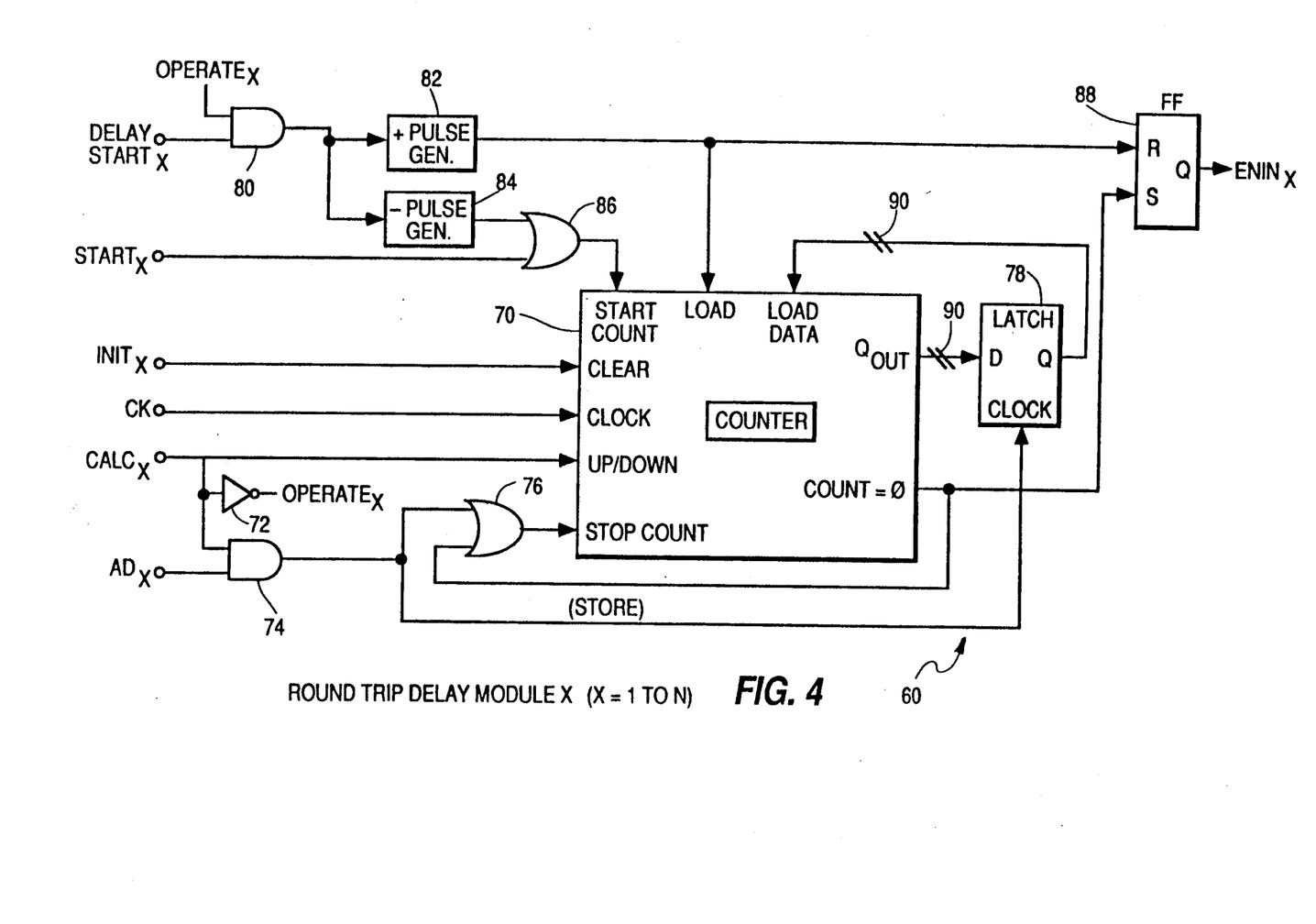
FIG. 4 illustrates the structure of a portion of FIG. 3 concerned with determining and storing round-trip delay time between the active star and each passive star coupler to which it is connected.

An exemplary round trip delay module 60 is illustrated in FIG. 4 to which its attention is now directed. In FIG. 4 the six input signal terminals and one output signal terminal are as illustrated in FIG. 3. In particular, $CALC_x$ is coupled to the UP/DOWN input of a standard digital counter 70 to make the counter count up or down depending on the value, logic level 1 (hereinafter LL1) of the $CALC_x$ signal. Typically a LL0 is a relatively low voltage signal and a LL1 is a relatively high voltage signal but the actual voltage levels depend on the type of logic circuits being utilized. $CALC_x$ is also coupled to the input of an inverter 72, the output of which is $OPERATE_x$, and to one input of AND gate 74. The $AD_x$ input is coupled to the second input of gate 74 while its output is coupled to one input of OR gate 76 and the clock input of a latch 78. The output of OR gate 76 is coupled to the STOP COUNT input of counter 70. The DELAY $START_x$ input to module X and the output from an inverter 72 are coupled to the two inputs of AND gate 80, the output of which is coupled to the input of + (positive) and − (negative) pulse generators 82 and 84, respectively. The output of generator 84 and the $START_x$ input are coupled to respective inputs of OR gate 86, the output of which is coupled to the START COUNT input of counter 70. The output of generator 82 is coupled to the LOAD input of counter 70 and the reset (R) input of flip-flop 88. The COUNT=0 output of counter 70 is coupled to a second input of OR gate 76 and to the set (S) input of flip-flop 88, the output of which is the $ENIN_x$ output of module 60. The Q output of latch 78 is coupled over multiconductor wires, indicated as such by cross-hatching 90, to the LOAD DATA input of counter 70, while the $Q_{OUT}$ output of counter 70 is coupled to the D input of latch 78. Finally, the CK input to module 60 is coupled to the CLOCK input of counter 70.

Operation of the entire system will start with the operation of a module 60-X, where X may be any number from 1 to N, after a sub-network comprising a passive star coupler 10 (FIG. 1) and users, if any, connected thereto has been added to the overall network comprising other passive star couplers, other users, and active star 30. After a passive star has been added to the network, a first requirement is to determine the round trip signal delay time from the active star to the newly added passive star and back to the active star.

The timing diagram of FIG. 5 will be used as an aid to explain how the round trip delay is calculated.

Referring for a moment to FIG. 3, external commands from a source (not shown) cause sequencer 64 to produce an initialization pulse $INIT_x$ on an appropriate INIT output at time $T_0$ (FIG. 5). That pulse, as indicated in FIG. 4, acts to clear counter 70 of any count that it may have had. A short time later at time $T_1$ (FIG. 5) a $START_x$ pulse is produced by sequencer 64 again under control of external commands. The $START_x$ count enables OR gate 86 which therefore produces a start count signal starting the upward count of counter 70 at a rate determined by the CK input to the CLOCK terminal of counter 70, it being remembered that the CK input is from a clock oscillator 68, FIG. 3. At the same time as the start pulse is produced, a typically longer ENABLE pulse is also produced by sequencer 64. The ENABLE pulse, as illustrated in FIGS. 3 and 5, commencing at time $T_1$ (FIG. 5) triggers signal generator 66 to produce a predetermined test signal for a duration $T_2$-$T_1$. Although illustrated as an alternating signal of uniform period, in point of fact the output may be of any desired value which is understood to be a test signal and not a data signal. The signal GEN OUT is transmitted to all multiplexers 52-X. However, only one multiplexer, that which is selected by an appropriate $CALC_x$ signal will pass the GEN OUT signal to its associated FOX and to the newly added passive star. In due course, determined by the round trip signal time, the transmitted test signal will be received from the passive star at the appropriate terminal 32-X as an optical signal and converted by FOR 40-X into an equivalent electrical signal. When the leading edge of the return signal is received at FOR 40-X at time $T_3$ (FIG. 5), activity detector 44-X with the $CALC_x$ signal at LL1 and $AD_x$ also LL1, AND gate 74 is enabled. The resulting LL1 output pulse enables OR gate 76 to issue a STOP COUNT pulse to counter 70. At the same time the LL1 signal from enabled AND gate 74 also enables the clock input of latch 78 to receive the count to which counter 70 has been driven into latch 78 via the $Q_{OUT}$ terminal of counter 70 and the D input terminal of latch 78.

At the end of the operation just described the count value in latch 78 represents the round trip time of a signal to go between a passive star associated with latch 78 and the active star in both directions. At that time $CALC_x$ is driven to LL0 (FIG. 5), due to the $AD_x$ signal being applied to the $DONE_x$ input of sequencer 64 in FIG. 3 and the active star is ready to receive data from and transmit data to the new passive star X. It will be understood that the delay value may be calculated by external means, and then be loaded into the appropriate passive star sub-network's latch. This could simplify the complexity of the active star's circuitry.

Operation of the system when it is desired to transmit and receive data from one user to another is described now in connection with reference to the timing diagrams (FIGS. 6 and 7) as appropriate. Assuming for the sake of discussion that a user connected to passive star 1 wishes to transmit a message. When the leading edge of the message reaches activity detector 44-1 (FIG. 3) at time $T_0$ (FIG. 6) $AD_1$ changes from LL0 to LL1. Furthermore, it will be assumed that $ENIN_x$ signals are at LL1 since counter 70 (FIG. 4) of all modules 60-X are at a count of zero causing flip-flop 88 to be set. The design of the counter 70 is such that the transition of $CALC_x$ from LL1 to LL0 as described, for example, in the preceding paragraph, causes the counter to generate a pulse on count=0 output, setting flip-flop 88.

Therefore, the LL1 signal $AD_1$ is applied to the AD terminal of module 60-1 but no action occurs since the LL0 CALC signal inhibits AND gate 74. Further, since $AD_1$ is not applied to OR gate 62-1 no LL1 delay $START_1$ signal is generated. With $ENIN_1$ at LL1 and $AD_1$ at LL1, $ENOUT_1$ is at LL0, inhibiting AND gate 50-1 so the message from passive star 1 is not retransmitted to passive star 1.

With reference now to all other modules 60-X (X≠1) and therefore all other passive stars 10-X (X≠1) and to FIG. 7 as necessary to understand the timing of the module 60-X, the LL1 AD$_1$ signal marking the presence of a message from passive, star 1 (FIG. 2) causes DELAY START$_x$(X≠1) to go to LL1 for the duration of the message. The LL1 leading edge of the delay start pulse causes plus or "positive edge" pulse generator 82 to produce a momentary pulse at time T$_0$ (FIG. 7) causing the counter 70 to load with the value stored in its related latch 78. It will be understood that the value stored in each latch 78 is typically different from all others and therefore the counters 70 will each contain a different value from the others. Further, the pulse from + pulse generator 82 resets flip-flop 88 causing its output, ENIN$_x$ to be at a LL0. The LL0 blocks input from all other passive stars at AND gates 46X (FIG. 3).

At the trailing edge of the message, when AD$_1$ goes to LL0, the positive-to-negative transition of the output from AND gate 80 causes minus or "negative edge" pulse generator 84 to produce a momentary pulse starting count down in counter 70 at a rate determined by oscillator 68 (FIG. 3). Count down, not count up occurs because CALC$_x$ applied to the up/down input of counter 70, is at a LL0 causing a down count. During count down ENIN$_x$ is still LL0 blocking any message input from any passive star (except passive star 1). When the count reaches 0 a LL1 COUNT$_x$=0 pulse occurs setting flip-flop 88 (FIG. 4) and thereby causing ENIN$_x$ to go to LL1 thus enabling AND gate 46-X to again receive messages from their respective passive stars. Thus, in summary, when a message is received from one star, message transfer back to that star is blocked for the message duration to avoid any echoes of the message and input from the other (N-1) stars is blocked for the message duration plus, for each station, the round trip delay to that station again preventing echoes of that message back into the active star and out to other passive stars.

What is claimed is:

1. Apparatus for use in a fiber optic network which also includes at least first and second passive stars and means providing a bidirectional signal transmission path between each of said passive stars and said apparatus, said apparatus comprising in combination:
   first means adapted for storing a value representing, with respect to each passive star, the time for the transmission of a pulse between said apparatus and each said passive star in both directions;
   second means adapted to receive a first signal from any one of said passive stars;
   third means adapted to transmit said first signal to each of said passive stars;
   fourth means coupled to said second and third means and adapted to respond to said first signal received from said any one of said passive stars for blocking transmission of a signal back to that passive star during the time duration that said first signal is being received; and
   fifth means coupled top said first means and said second means and adapted to block receipt of a second signal from any other of said passive starts for a time which is a function of the duration of said first signal plus said value stored in said first means.

2. The combination as set forth in claim 1 wherein said first means comprises means for transmitting a test signal to one of said passive stars, means for determining the time lapse between the time of transmission of said test signal and the time of receipt of said test signal and means for storing said time lapse as said value.

3. The combination as set forth in claim 2 wherein said means for determining said time lapse comprises a source of clock signal pulses and a counter for counting the number of clock pulses occurring during said time lapse.

4. The combination as set forth in claim 1 wherein said first signal includes a leading edge defining the beginning of said first signal and a trailing edge defining the end of said first signal, said fifth means comprises means for determining the presence of said leading edge and said trailing edge of said first signal received from said any one of said passive stars and means for blocking receipt of said second signal from said any other of said passive stars between said leading edge and said trailing edge and then responsive to said stored value for also blocking receipt of said second signal from said any other of said passive stars for a further duration corresponding to the value.

5. The combination as set forth in claim 4 further including a source of clock pulses and wherein said first means includes means storing said value as a count of said clock pulses and wherein said fifth means comprises a counter responsive to said clock pulses for counting to a count corresponding to said count in said first means.

6. The combination as set forth in claim 5 wherein said first means comprises means for transmitting a test signal to one of said passive stars, means for determining the time lapse between the time of transmission of said test signal and the time of receipt of said test signal and means for storing the time lapse as said value.

7. The combination as set forth in claim 6 wherein said means for determining said time lapse comprises a source of clock signal pulses and a counter for counting the number of clock pulses occurring during said time lapse.

8. The combination as set forth in claim 1 wherein said network includes at least one additional passive star, wherein said first means is adapted for determining and storing said value for each of said passive stars, said fifth means is adapted to block receipt of a signal from all of said passive stars except the one that said first signal is being received from.

9. The combination as set forth in claim 8 wherein said first means comprises means for transmitting a test signal to one of said passive stars, means for determining the time lapse between the transmission of said test signal and the receipt of said test signal and means for storing the time lapse as said value.

10. The combination as set forth in claim 9 wherein said means for determining said time lapse comprises a source of clock signal pulses and a counter for counting the number of clock pulses occurring during said time lapse.

11. The combination as set forth in claim 10 wherein said fifth means comprises means for determining the leading edge and the trailing edge of said first signal received from said one of said passive stars and means for blocking receipt of any signal from all other of said passive stars between said leading edge and said trailing edge and then responsive to the stored value for also blocking receipt of any signal from all other of said passive stars for a further duration corresponding to that delay time.

12. The combination as set forth in claim 11 further including a source of clock pulses and wherein said first means includes means storing said value as a count of said clock pulses and wherein said fifth means comprises a counter responsive to said clock pulses for counting to said count in said first means.

13. The combination as set forth in claim 12 wherein said first means comprises means for transmitting a test signal to one of said passive stars, means for determining the time lapse between the transmission of said test signal and the receipt of said test signal and means for storing the time lapse as said value.

14. The combination as set forth in claim 13 wherein said means for determining said time lapse comprises a source of clock signal pulses and a counter for counting the number of clock pulses occurring during said time lapse.

* * * * *

UNITED STATES PATENT AND TRADEMARK OFFICE
CERTIFICATE OF CORRECTION

PATENT NO. : 5,073,982

DATED : December 17, 1991

INVENTOR(S) : J. P. Viola et al

It is certified that error appears in the above-identified patent and that said Letters Patent is hereby corrected as shown below:

Column 7, claim 1, line 58, "top" should read --to--.

Column 8, claim 4, line 18, "the" should read --that--.

Signed and Sealed this

Twenty-third Day of March, 1993

*Attest:*

STEPHEN G. KUNIN

*Attesting Officer*     *Acting Commissioner of Patents and Trademarks*